US008882415B2

(12) United States Patent
Nagao et al.

(10) Patent No.: US 8,882,415 B2
(45) Date of Patent: Nov. 11, 2014

(54) TELESCOPIC COVER OF MACHINE TOOL

(71) Applicant: Fanuc Corporation, Yamanashi (JP)

(72) Inventors: Akihiko Nagao, Yamanashi (JP); Naoki Sato, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/872,715

(22) Filed: Apr. 29, 2013

(65) Prior Publication Data

US 2013/0327178 A1 Dec. 12, 2013

(30) Foreign Application Priority Data

Jun. 11, 2012 (JP) .................................. 2012-131965

(51) Int. Cl.
*B23Q 11/08* (2006.01)

(52) U.S. Cl.
CPC ................................. *B23Q 11/0825* (2013.01)
USPC .................. 409/134; 74/608; 74/609; 74/612

(58) Field of Classification Search
CPC ..................................................... B23Q 11/08
USPC .................... 409/134; 74/608, 609, 612–616; 160/223, 202
See application file for complete search history.

(56) References Cited

U.S. PATENT DOCUMENTS

| 2,253,846 | A | * | 8/1941 | Cornell | 384/15 |
| 2,430,827 | A | * | 11/1947 | Rougemont | 384/15 |
| 5,570,979 | A | | 11/1996 | Okamoto et al. | |
| 6,039,516 | A | | 3/2000 | Diels | |
| 2002/0172570 | A1 | * | 11/2002 | Tsurumaki | 409/134 |
| 2005/0082118 | A1 | | 4/2005 | Funakoshi et al. | |
| 2011/0017410 | A1 | | 1/2011 | Yamashita et al. | |

FOREIGN PATENT DOCUMENTS

| CN | 100566930 C | 12/2009 |
| CN | 202079433 U | 12/2011 |
| DE | 10109134 A1 | 9/2002 |
| JP | 560752 U | 8/1993 |
| JP | 8-057741 A | 3/1996 |
| JP | 9285940 A | 11/1997 |
| JP | 1190764 A | 4/1999 |
| JP | 11156666 A | 6/1999 |
| JP | 2007-276044 A | 10/2007 |
| JP | 2011-025324 A | 2/2011 |

OTHER PUBLICATIONS

Decision to Grant a Patent mailed Jun. 25, 2013 corresponds to Japanese patent application No. 2012-131965.
Notification to Grant Patent Right mailed Aug. 4, 2014, corresponds to Chinese patent application No. 201310231245.0.

* cited by examiner

*Primary Examiner* — Andrea Wellington
*Assistant Examiner* — Ryan Rufo
(74) *Attorney, Agent, or Firm* — Lowe Hauptman & Ham, LLP (57) ABSTRACT

A telescopic cover of a machine tool is provided with two movable covers connected by a joint, two pulleys mounted on the joint, and a single wire stretched around and between the two pulleys. One and the other ends of the wire are secured to the mobile element, and a middle portion of the wire to a fixed portion. In this arrangement, the two movable covers connected by the joint move half the movement stroke of the mobile element in association with the action of the mobile element.

10 Claims, 8 Drawing Sheets

TELESCOPIC COVER OF MACHINE TOOL

RELATED APPLICATIONS

The present application is based on, and claims priority from, Japanese Application Number 2012-131965, filed Jun. 11, 2012, the disclosure of which is hereby incorporated by reference herein in its entirety.

BACKGROUND OF THE INVENTION

1. Field of the Invention

The present invention relates to a telescopic cover for use as a movable cover of a machine tool.

2. Description of the Related Art

In a machine tool, a drive unit must be protected from chips and cutting fluids and a cover is used for this purpose. To prevent the machine tool from becoming bulky due to the presence of the cover, moreover, a so-called telescopic cover configured to extend and contract as a feed shaft axially moves is used as the protective cover for the drive unit. One such telescopic cover of a conventional machine tool will be described below with reference to FIGS. 8 and 9.

Figure 8:
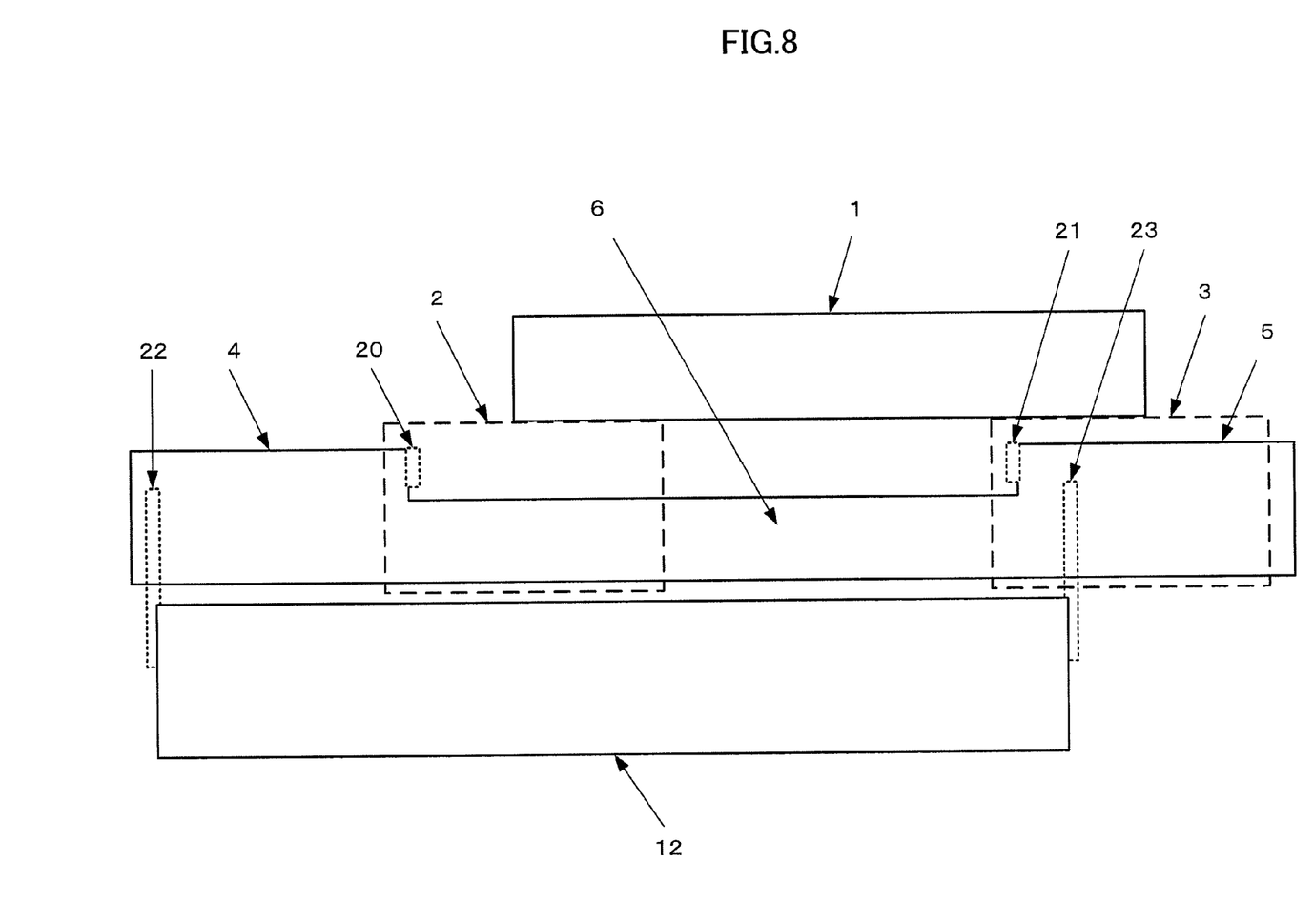
FIG. 8 is a view illustrating a telescopic cover of a conventional machine tool and shows a state in which a mobile element is located at one end (right-hand end) of a fixed portion in its movement direction.
Figure 9:
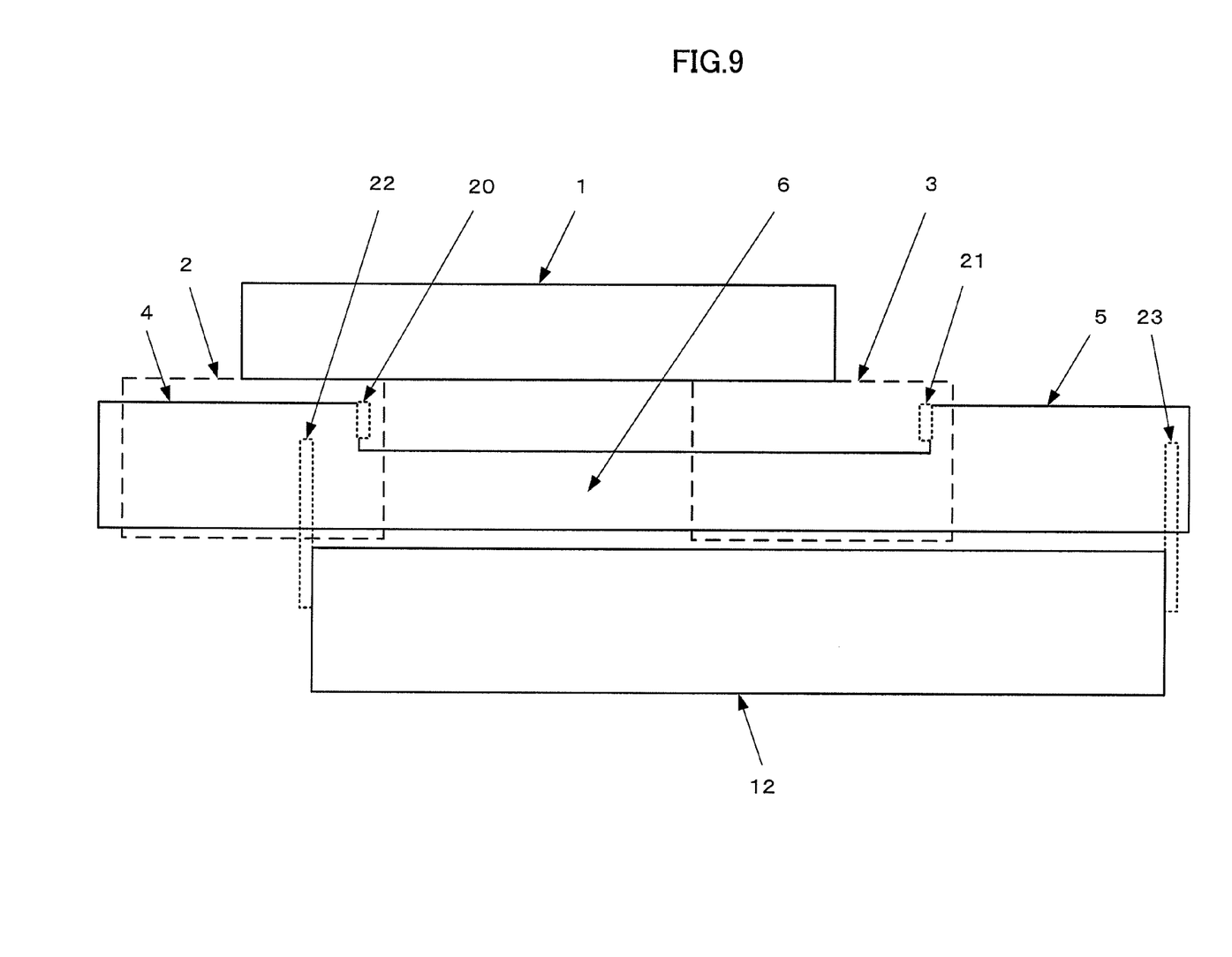
FIG. 9 shows a state in which the mobile element of the telescopic cover of FIG. 8 is located at the other end (left-hand end) of the fixed portion.

FIG. 8 shows a state in which a mobile element 1 is located at one end (right-hand end) of a fixed portion 12 in its movement direction (left-right direction in FIG. 8), and FIG. 9 shows a state in which the mobile element 1 is located at the other end (left-hand end) of the fixed portion 12 in the movement direction.

First and second fixed covers 2 and 3 are secured to the mobile element 1. These covers 2 and 3 support first and second movable covers 4 and 5, respectively, so as to embrace them. In this way, the first fixed and movable covers 2 and 4 form one telescopic cover, and the second fixed and movable covers 3 and 5 form another. Thus, the first movable cover 4 is movable relative to the first fixed cover 2 in such a manner that at least part of it is surrounded by the first fixed cover 2, while the second movable cover 5 is movable relative to the second fixed cover 3 in such a manner that at least part of it is surrounded by the second fixed cover 3.

Stoppers 20 and 21 are secured to the first and second movable covers 4 and 5, respectively. Further, stoppers 22 and 23 are secured to one and the other ends, respectively, of the fixed portion 12. When the mobile element 1, which is movable relative to the fixed portion 12 in the left-right direction, is located at the right-hand end, as shown in FIG. 8, the motions of the first movable cover 4 and the second fixed cover 3 are braked by the stoppers 22 and 21, respectively. When the mobile element 1 is located at the left-hand end, as shown in FIG. 9, in contrast, the motions of the second movable cover 5 and the first fixed cover 2 are braked by the stoppers 23 and 20, respectively.

Japanese Patent Applications Laid-Open Nos. 2011-025324 and 2007-276044 discloses a pantograph used to extend and contract a telescopic cover of the type described above. The pantograph is extended and contracted in synchronism with a movement of a machine by a feed shaft. However, this technique configured to extend and contract the telescopic cover by means of the pantograph has problems that the structure is complicated and expensive and that a link shaft is worn and broken by rapid axial movement.

On the other hand, Japanese Patent Application Laid-Open No. 8-57741 discloses a telescopic cover of the above-described type, comprising a first cover member and a second cover member supported by the first cover member. The first cover member is attached to a mobile element of a machine tool capable of reciprocating in a linear direction and movable together with the mobile element. The second cover member is movable in the linear direction in association with the action of the first cover member. This telescopic cover has a simpler construction than a telescopic cover which uses the pantograph or the like. In this structure, however, stoppers are arranged individually on the opposite side end portions of a movable range of the second cover member so that extension and contraction of the telescopic cover (i.e., first and second cover members) are suppressed by them. It is necessary, therefore, to follow rapid axial movement, thereby mitigating impact caused by the axial movement. Consequently, this telescopic cover is easy to break and requires scheduled maintenance.

SUMMARY OF THE INVENTION

Accordingly, in view of the above-described problems of the present invention, it is an object of the present invention to provide a durable telescopic cover of a machine tool, in which movable covers are capable of high-speed, high-acceleration/deceleration movement.

A telescopic cover of a machine tool according to the present invention comprises a pair of first cover members attached to a mobile element capable of reciprocating relative to a fixed portion of the machine tool in a predetermined linear direction and disposed for movement along with the mobile element, a pair of second cover members supported by the pair of first cover members, and a connecting member which connects the pair of second cover members to each other, wherein the pair of second cover members are movable in the linear direction in association with the action of the pair of first cover members.

According to a first aspect of the present invention, the telescopic cover of a machine tool further comprises a first pulley and a second pulley individually disposed on a joint body formed of the pair of second cover members and the connecting member, at a predetermined distance from each other in the linear direction, and a single wire stretched around and between the first and second pulleys. One and the other end portions of the wire are secured to the fixed portion on one side of a line segment which connects the respective centers of rotation of the first and second pulleys, and a middle portion of the wire is secured to the mobile element on the other side of the line segment.

The one and the other end portions of the wire may be secured to the fixed portion by means of elastic bodies, individually.

According to a second aspect of the present invention, a telescopic cover of a machine tool further comprises a first pulley and a second pulley individually disposed on a joint body formed of the pair of second cover members and the connecting member, at a predetermined distance from each other in the linear direction, and a single wire stretched around and between the first and second pulleys. One and the other end portions of the wire are secured to the mobile element on one side of a line segment which connects the respective centers of rotation of the first and second pulleys, and a middle portion of the wire is secured to the fixed portion on the other side of the line segment.

The one and the other end portions of the wire are secured to the mobile element by means of elastic bodies, individually.

According to a third aspect of the present invention, a telescopic cover of a machine tool further comprises a first pulley and a second pulley individually disposed on a joint body formed of the pair of second cover members and the connecting member, at a predetermined distance from each other in the linear direction, and an endless wire stretched around and between the first and second pulleys. One portion of the wire is secured to the fixed portion on one side of a line segment which connects the respective centers of rotation of the first and second pulleys, and another portion of the wire is secured to the mobile element on the other side of the line segment.

According to a fourth aspect of the present invention, a telescopic cover of a machine tool further comprises a first pulley and a second pulley individually disposed on a joint body formed of the pair of second cover members and the connecting member, at a predetermined distance from each other in the linear direction, a single first wire stretched around the first pulley, and a single second wire stretched around the second pulley. Respective one ends of the first and second wires are individually secured to the fixed portion, and the respective other ends of the first and second wires are individually secured to the mobile element.

Based on the configuration described above, the present invention can provide a durable telescopic cover of a machine tool, in which movable covers are capable of high-speed, high-acceleration/deceleration movement.

BRIEF DESCRIPTION OF THE DRAWINGS

The above and other objects and features of the present invention will be obvious from the ensuing description of embodiments with reference to the accompanying drawings, in which.

DESCRIPTION OF THE PREFERRED EMBODIMENTS

A first embodiment of a telescopic cover according to the present invention will first be described with reference to FIGS. 1 to 4.

A mobile element 1 is disposed over a fixed portion 12 and configured to be reciprocated in one linear direction (left-right direction in FIG. 1, hereinafter referred to as the X-axis direction) by first drive means (not shown). The fixed portion 12 is configured to be reciprocated in a Y-axis direction perpendicular to the X-axis direction by second drive means (not shown). A table of a machine tool is a typical example of the mobile element 1, on which a workpiece (not shown) is placed. A saddle is a typical example of the fixed portion 12. As the mobile element 1 and the fixed portion 12 are individually reciprocated, the workpiece on the mobile element 1 can be moved in a two-axis plane defined by the X- and Y-axes.

Figure 1:
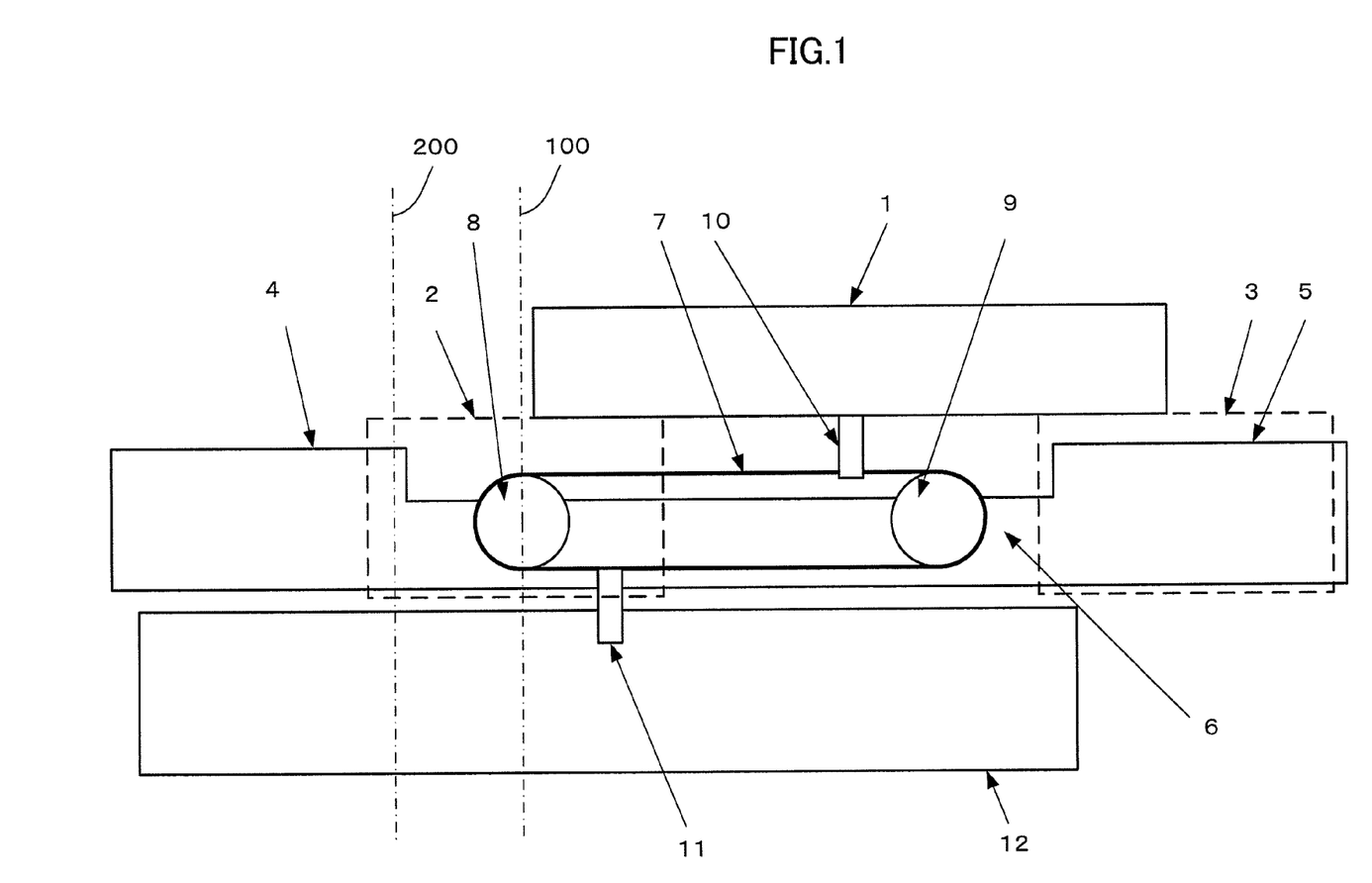
FIG. 1 is a view illustrating a first embodiment of a telescopic cover according to the present invention and shows a state in which a mobile element is located at one end (right-hand end) of a fixed portion in its movement direction.
Figure 2:
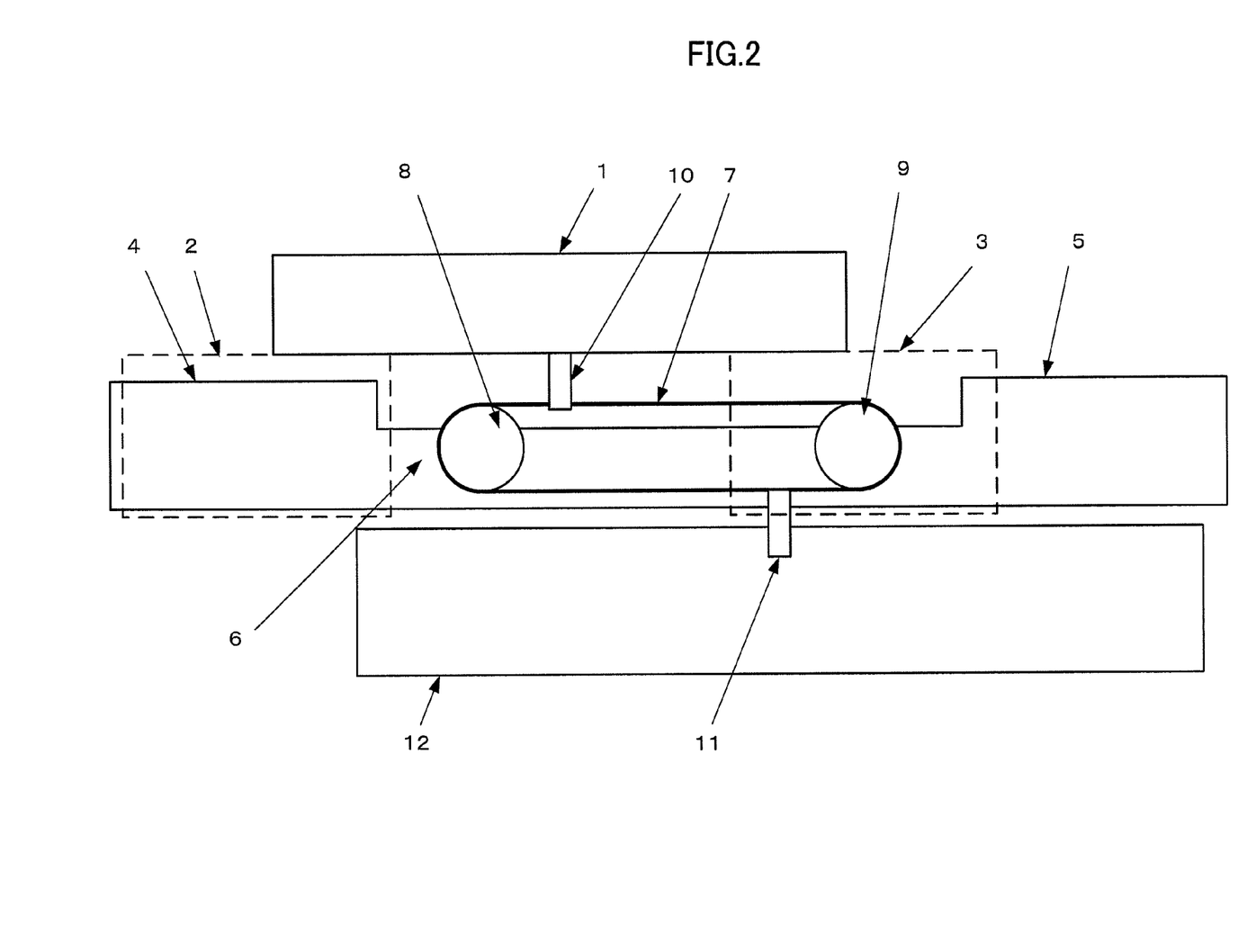
FIG. 2 shows a state in which the mobile element of the telescopic cover of FIG. 1 is located at the other end (left-hand end) of the fixed portion.

FIG. 1 shows a state in which the mobile element 1 is located at one end (right-hand end) of the fixed portion 12 in its movement direction (X-axis direction), and FIG. 2 shows a state in which the mobile element 1 is located at the other end (left-hand end) of the fixed portion 12 in its movement direction (X-axis direction).

Figure 4:
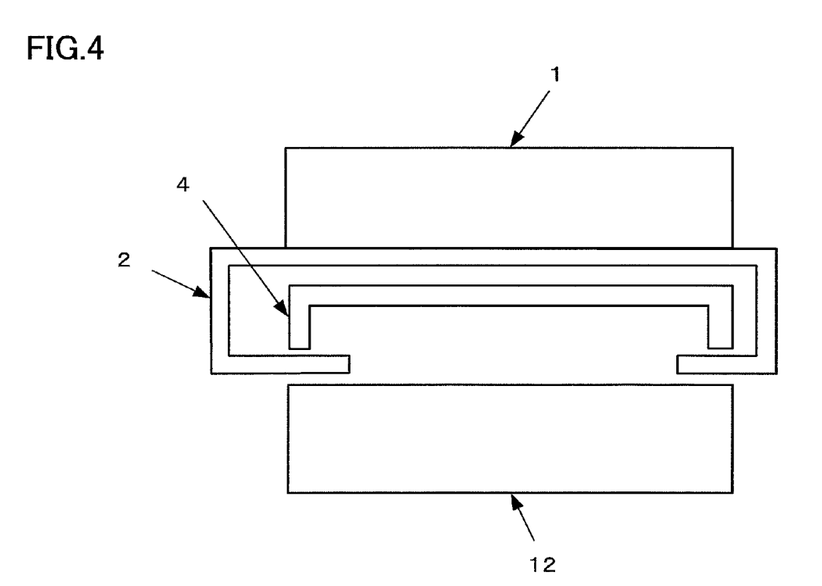
FIG. 4 is a sectional view taken along a dash-dotted line 200 of FIG. 1.

First and second fixed covers 2 and 3 are secured to one and the other end sides, respectively, of the mobile element 1 in its movement direction (X-axis direction). As shown in FIG. 4, the first fixed cover 2 slidably supports a first movable cover 4 so as to embrace it. Likewise, the second fixed cover 3 slidably supports a second movable cover 5 so as to embrace it. The first and second movable covers 4 and 5 are connected by a joint 6.

Thus, the first movable cover 4 is movable relative to the first fixed cover 2 in such a manner that at least part of it is surrounded by the first fixed cover 2, while the second movable cover 5 is movable relative to the second fixed cover 3 in such a manner that at least part of it is surrounded by the second fixed cover 3. Consequently, the first fixed and movable covers 2 and 4 form one telescopic cover, and the second fixed and movable covers 3 and 5 form another.

Figure 3:
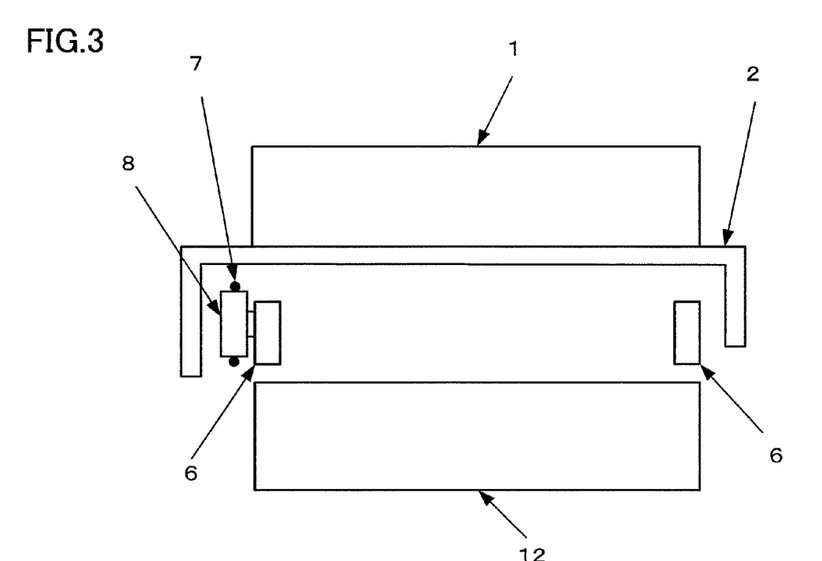
FIG. 3 is a sectional view taken along a dash-dotted line 100 of FIG. 1.

First and second pulleys 8 and 9 are individually rotatably mounted on one side surface of the joint 6, which connects the first and second movable covers 4 and 5, with a predetermined space therebetween in the X-axis direction. While FIG. 3 shows an example in which the first and second pulleys 8 and 9 are mounted only on the one side surface of the joint 6, they may also be mounted on the other side surface of the joint 6.

A mobile element connecting member 10 is attached to the central part of the mobile element 1 in its movement direction (X-axis direction). On the other hand, a fixed portion connecting member 11 is attached to the central part of the fixed portion 12 in the X-axis direction.

A single wire 7 (non-endless) is stretched around and between the first and second pulleys 8 and 9. One end (first end portion) of the wire 7 is secured to one side end of the mobile element connecting member 10, and the other end (second end portion) of the wire 7 is secured to the other side end of the connecting member 10. Further, the wire 7 is secured to the fixed portion connecting member 11 (i.e., fixed portion 12) by causing the connecting member 11 to clamp a middle portion of the wire 7.

In the example shown in FIGS. 1 and 2, the first and second end portions of the wire 7 are secured to the mobile element 1 by the mobile element connecting member 10 on one side of a line segment that connects the respective centers of rotation of the first and second pulleys 8 and 9. On the other side of the line segment, the middle portion of the wire 7 is secured to the fixed portion 12 by the fixed portion connecting member 11. Alternatively, the first and second end portions of the wire 7 may be secured to the fixed portion 12 by the fixed portion connecting member 11 on one side of the line segment that connects the respective centers of rotation of the first and second pulleys 8 and 9. In this case, the middle portion of the wire 7 is secured to the mobile element 1 by the mobile element connecting member 10 on the other side of the line segment.

Thus, the first and second movable covers 4 and 5 connected by the joint 6 can integrally move in association with or follow the action of the mobile element 1. More specifically, as described in detail later with reference to FIG. 5, the first and second movable covers 4 and 5 connected by the joint 6 can fully protect a drive unit from chips and cutting fluids by only integrally moving half the movement stroke of the mobile element 1. In addition, movements of the first and second movable covers 4 and 5 in association with the action of the mobile element 1 can considerably prevent the machine tool from generally becoming larger. Further, the movable covers 4 and 5 connected by the joint 6 move as an integral structure in synchronism with the mobile element 1. It is unnecessary, therefore, to suppress the movements (telescopic actions) of the first and second movable covers 4 and 5 relative to the first and second fixed covers 2 and 3, respectively, by means of stoppers at the opposite ends in the movement direction, so that neither noise nor impact is produced.

The wire 7 may be replaced with a rope, string, steel cable, belt, or chain. If a belt, chain, or the like is used in place of the wire 7, sprockets may be used for the first and second pulleys 8 and 9.

Figure 5:
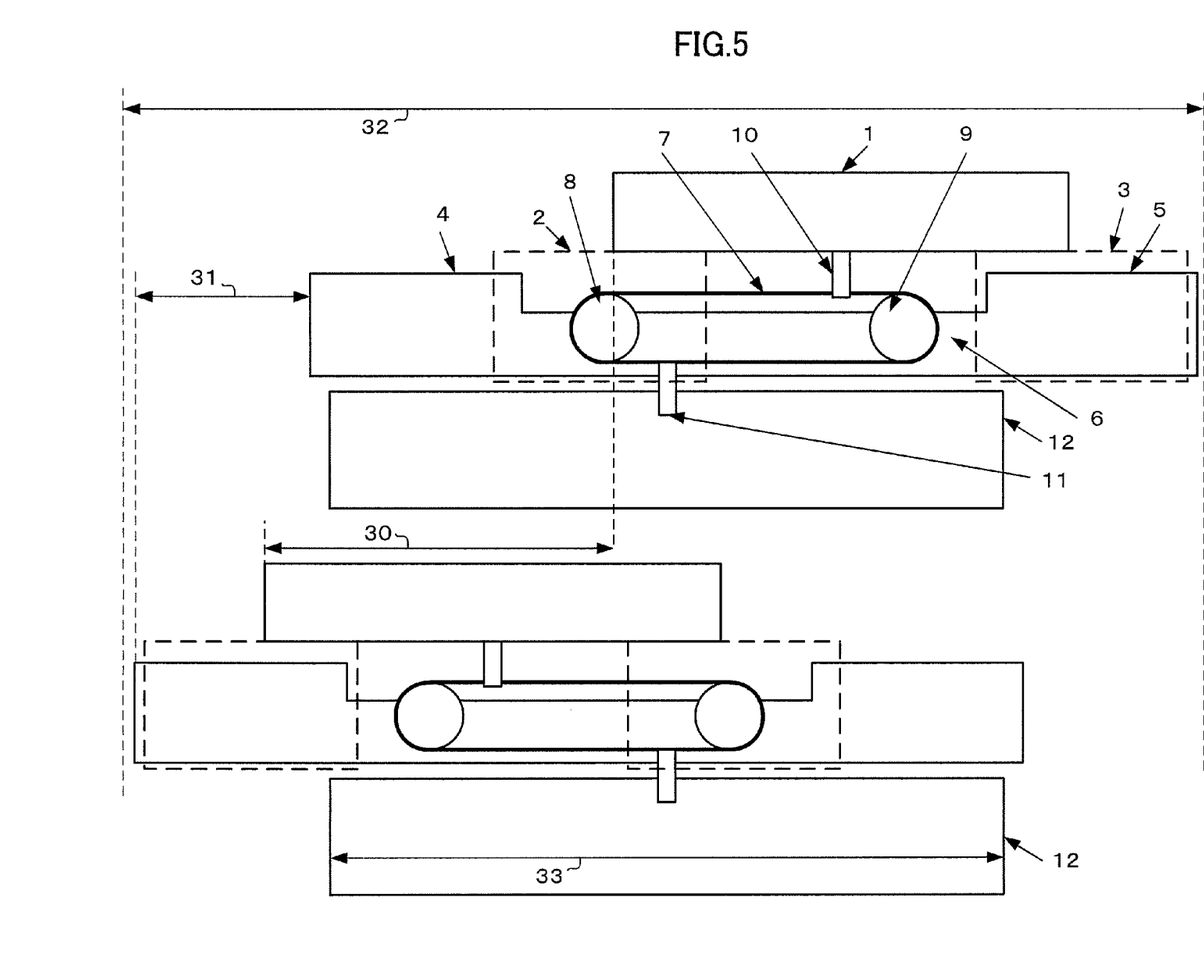
FIG. 5 is a view illustrating the moving distance of the mobile element of the telescopic cover of FIG. 1, the moving distance of a moving part, the size of a machine tool, and a range of a drive unit that requires protection from chips and cutting fluids.

FIG. 5 is a view illustrating the moving distance of the mobile element, the moving distance of a moving part, the size of the machine tool, and a range of the drive unit that requires protection from chips and cutting fluids.

The upper drawing of FIG. 5 shows a state in which the mobile element 1 is located at the right-hand end of the fixed portion 12 in its movement direction (X-axis direction), as in the state shown in FIG. 1. The lower drawing of FIG. 5 shows a state in which the mobile element 1 is located at the left-hand end of the fixed portion 12, as in the state shown in FIG. 2. In FIG. 5, moreover, reference numeral 30 denotes the moving distance of the mobile element 1, reference numeral 31 denotes the moving distance of the integral structure (moving part) formed of the first and second movable covers 4 and 5 connected by the joint 6, reference numeral 32 denotes the overall size of the machine tool, and reference numeral 33 denotes the range of the drive unit that requires protection from chips and cutting fluids.

As seen from FIG. 5, the mobile element connecting member 10 attached to the mobile element 1 has a movable range as long as the moving distance 30 of the mobile element 1 in its movement direction (X-axis direction).

A second embodiment of the telescopic cover according to the present invention will now be described with reference to FIG. 6.

A single wire 7 (endless) is stretched around and between first and second pulleys 8 and 9. One end (first end portion) of the wire 7 is secured to one side end of a fixed portion connecting member 11 by means of an elastic member 13, such as a spring, and the other end (second end portion) is secured to the other side end of the connecting member 11 by means of an elastic member 14, such as a spring. Further, the wire 7 is secured to a mobile element connecting member 10 by causing the connecting member 10 to clamp a middle portion of the wire 7. According to this embodiment, the first and second end portions of the single wire 7 are secured to the fixed portion connecting member 11 by means of the elastic members 13 and 14, so that the tension of the wire 7 can be maintained despite elongation of the wire caused by the movement of a mobile element 1.

Figure 6:
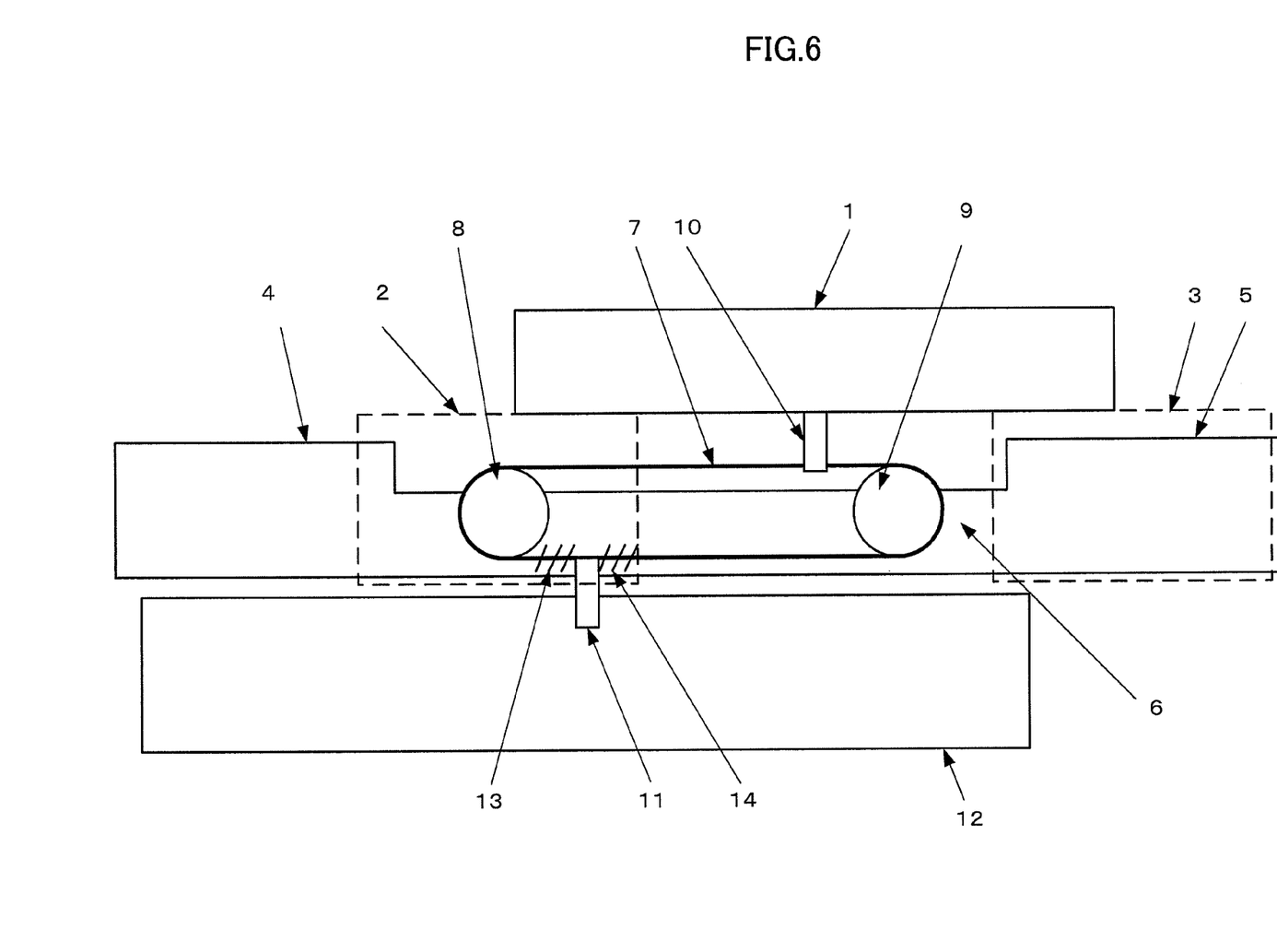
FIG. 6 is a view illustrating a second embodiment of the telescopic cover according to the present invention.

In contrast with the case shown in FIG. 6, moreover, the first end portion of the wire 7 may alternatively be secured to one side end of the mobile element connecting member 10 by means of the elastic member 13, and the second end portion of the wire 7 may be secured to the other side end of the connecting member 10 by means of the elastic member 14. In this case, the middle portion of the wire 7 may be clamped by the fixed portion connecting member 11.

Figure 7:
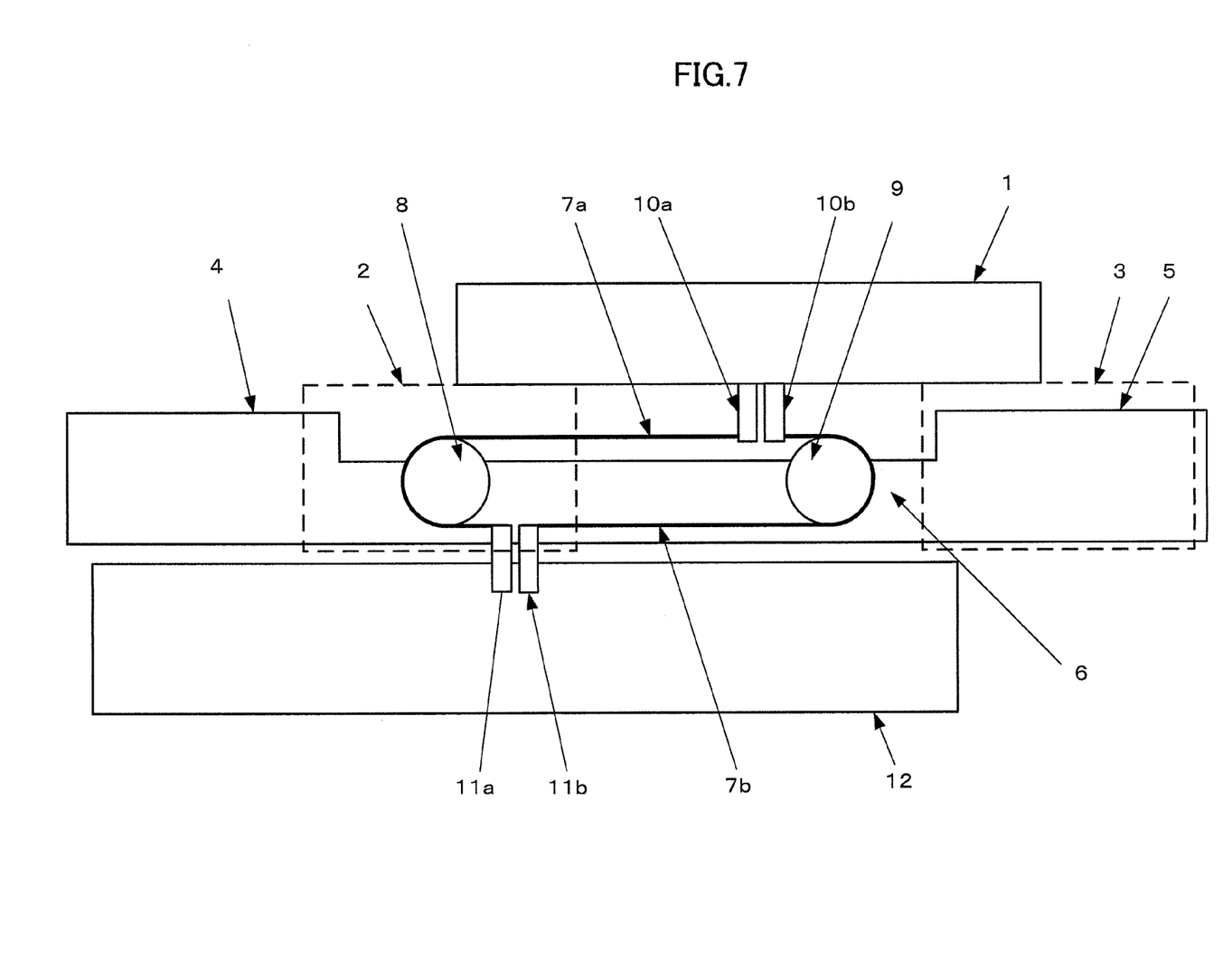
FIG. 7 is a view illustrating a third embodiment of the telescopic cover according to the present invention.

A third embodiment of the telescopic cover according to the present invention will now be described with reference to FIG. 7.

First and second mobile element connecting members 10a and 10b are attached to the central part of a mobile element 1 in its movement direction (X-axis direction). On the other hand, first and second fixed portion connecting members 11a and 11b are attached to the central part of a fixed portion 12 in the X-axis direction. A first wire 7a, out of two, is stretched around a first pulley 8, and a second wire 7b is stretched around a second pulley 9. One end of the wire 7a stretched around the first pulley 8 is secured to the first mobile element connecting member 10a, and the other end of the wire 7a is secured to the first fixed portion connecting member 11a. On the other hand, one end of the wire 7b stretched around the second pulley 9 is secured to the second mobile element connecting member 10b, and the other end of the wire 7b is secured to the second fixed portion connecting member 11b.

The following is a description of a fourth embodiment of the telescopic cover according to the present invention.

In the first embodiment described with reference to FIGS. 1 and 2, the first and second end portions of the single wire 7 are individually secured to the mobile element connecting member 10, and the middle portion of the wire 7 is clamped by the fixed portion connecting member 11. Instead, according to the present embodiment, a first portion of an endless wire 7 is clamped by a mobile element connecting member 10, and a second portion different from the first portion is clamped by a fixed portion connecting member 11.

In any of the embodiments described above, the wire 7 is secured to the mobile element connecting member 10 on one side of the line segment that connects the respective centers of rotation of the first and second pulleys 8 and 9, whereas the wire 7 is secured to the fixed portion connecting member 11 on the other side of the line segment.

As described herein, the present invention is configured so that one or two non-endless wires or an endless wire is stretched around and between two pulleys (first and second pulleys 8 and 9) that are spaced in the movement direction (X-axis direction) of the mobile element 1. Thus, the telescopic cover can be extended and contracted without using a complicated structure, such as a pantograph, so that it can be a low-priced, reliable telescopic cover for a machine tool. According to the present invention, moreover, the durability of the telescopic cover can be improved compared with the case where the motions of movable covers are limited by stoppers. Further, a low-priced telescopic cover capable of reliably fulfilling its function can be obtained by using generally reliable, low-priced components. In addition, wear of and impact on components can be reduced even in the case of high-speed, high-acceleration/deceleration movement.

The invention claimed is:

1. A telescopic cover of a machine tool, which comprises a pair of first cover members attached to a mobile element capable of reciprocating relative to a fixed portion of the machine tool in a predetermined linear direction and disposed for movement along with the mobile element, a pair of second cover members supported by the pair of first cover members, and a connecting member which connects the pair of second cover members to each other, wherein the pair of second cover members are movable in the linear direction in association with the action of the pair of first cover members, and the telescopic cover further comprises:

a first pulley and a second pulley individually disposed on a joint body formed of the pair of second cover members and the connecting member, at a predetermined distance from each other in the linear direction; and a single wire stretched around and between the first and second pulleys, wherein one and the other end portions of the wire are secured to the fixed portion on one side of a line segment which connects the respective centers of rotation of the first and second pulleys and a middle portion of the wire is secured to the mobile element on the other side of the line segment.

2. The telescopic cover of a machine tool according to claim 1, wherein the one and the other end portions of the wire are secured to the fixed portion by means of elastic bodies, individually.

3. The telescopic cover of a machine tool according to claim 1, wherein a chain or a belt is used in place of the wire, and the first and second pulleys are sprockets.

4. A telescopic cover of a machine tool, which comprises a pair of first cover members attached to a mobile element capable of reciprocating relative to a fixed portion of the machine tool in a predetermined linear direction and disposed for movement along with the mobile element, a pair of second cover members supported by the pair of first cover members, and a connecting member which connects the pair of second cover members to each other, wherein the pair of second cover members are movable in the linear direction in association with the action of the first cover members, and the telescopic cover further comprises:

a first pulley and a second pulley individually disposed on a joint body formed of the pair of second cover members and the connecting member, at a predetermined distance from each other in the linear direction; and a single wire stretched around and between the first and second pulleys, wherein one and the other end portions of the wire are secured to the mobile element on one side of a line segment which connects the respective centers of rotation of the first and second pulleys and a middle portion of the wire is secured to the fixed portion on the other side of the line segment.

5. The telescopic cover of a machine tool according to claim 4, wherein the one and the other end portions of the wire are secured to the mobile element by means of elastic bodies, individually.

6. The telescopic cover of a machine tool according to claim 4, wherein a chain or a belt is used in place of the wire, and the first and second pulleys are sprockets.

7. A telescopic cover of a machine tool, which comprises a pair of first cover members attached to a mobile element capable of reciprocating relative to a fixed portion of the machine tool in a predetermined linear direction and disposed for movement along with the mobile element, a pair of second cover members supported by the pair of first cover members, and a connecting member which connects the pair of second cover members to each other, wherein the pair of second cover members is movable in the linear direction in association with the action of the first cover members, and the telescopic cover further comprises:

a first pulley and a second pulley individually disposed on a joint body formed of the pair of second cover members and the connecting member, at a predetermined distance from each other in the linear direction; and an endless wire stretched around and between the first and second pulleys, wherein one portion of the wire is secured to the fixed portion on one side of a line segment which connects the respective centers of rotation of the first and second pulleys and another portion of the wire is secured to the mobile element on the other side of the line segment.

8. The telescopic cover of a machine tool according to claim 7, wherein a chain or a belt is used in place of the wire, and the first and second pulleys are sprockets.

9. A telescopic cover of a machine tool, which comprises a pair of first cover members attached to a mobile element capable of reciprocating relative to a fixed portion of the machine tool in a predetermined linear direction and disposed for movement along with the mobile element, a pair of second cover members supported by the pair of first cover members, and a connecting member which connects the pair of second cover members to each other, wherein the pair of second cover members is movable in the linear direction in association with the action of the first cover members, and the telescopic cover further comprises:

a first pulley and a second pulley individually disposed on a joint body formed of the pair of second cover members and the connecting member, at a predetermined distance from each other in the linear direction;

a single first wire stretched around the first pulley; and a single second wire stretched around the second pulley, wherein respective one ends of the first and second wires are individually secured to the fixed portion and the respective other ends of the first and second wires are individually secured to the mobile element.

10. The telescopic cover of a machine tool according to claim 9, wherein a chain or a belt is used in place of the wire, and the first and second pulleys are sprockets.

* * * * *